US012802158B2

(12) United States Patent
Ihara

(10) Patent No.: US 12,802,158 B2
(45) Date of Patent: Nov. 17, 2026

(54) INFORMATION PROCESSING DEVICE, INFORMATION PROCESSING METHOD, AND COMPUTER-READABLE NON-TRANSITORY STORAGE MEDIUM FOR REDUCING HIGH-DEFINITION RENDERING PROCESSING TIME

(71) Applicant: Sony Group Corporation, Tokyo (JP)

(72) Inventor: Toshinori Ihara, Tokyo (JP)

(73) Assignee: SONY GROUP CORPORATION, Tokyo (JP)

( * ) Notice: Subject to any disclaimer, the term of this patent is extended or adjusted under 35 U.S.C. 154(b) by 223 days.

(21) Appl. No.: 18/730,131

(22) PCT Filed: Jan. 10, 2023

(86) PCT No.: PCT/JP2023/000250

§ 371 (c)(1),
(2) Date: Jul. 18, 2024

(87) PCT Pub. No.: WO2023/166852

PCT Pub. Date: Sep. 7, 2023

(65) Prior Publication Data

US 2026/0195847 A1 Jul. 9, 2026

(30) Foreign Application Priority Data

Mar. 1, 2022 (JP) ................................ 2022-030697

(51) Int. Cl.
*G06T 3/40* (2024.01)
*G06T 5/60* (2024.01)
(Continued)

(52) U.S. Cl.
CPC .................. *G06T 3/40* (2013.01); *G06T 5/60* (2024.01); *G06V 10/761* (2022.01); (Continued)

(58) Field of Classification Search
CPC ... G06T 3/40; G06T 5/60; G06T 2207/10016; G06T 2207/20081; G06V 10/761; G06V 20/40; G06V 10/774; G06V 10/776
See application file for complete search history.

(56) References Cited

U.S. PATENT DOCUMENTS 10,701,394 B1 6/2020 Caballero
2013/0156345 A1* 6/2013 Shmunk ................ H04N 25/48 382/299
(Continued)

FOREIGN PATENT DOCUMENTS

JP 2019008599 A * 1/2019
JP 2019-528514 A 10/2019
(Continued)

OTHER PUBLICATIONS

Vavilala et al., Deep Learned Super Resolution for Feature Film Production, SIGGRAPH '20 Talks, Aug. 17, 2020, pp. 1-2.
(Continued)

*Primary Examiner* — Terrell M Robinson
(74) *Attorney, Agent, or Firm* — Paratus Law Group, PLLC

(57) ABSTRACT

An information processing device (1) includes a tuning unit (13) and an upconverter (14). The tuning unit (13) fine-tunes an image processing network (NW) using, as a learning data set, a first low-resolution video (LV1) and a high-resolution video (HV) corresponding to a part of a sequence. The upconverter (14) up-scales a second low-resolution video (LV2) corresponding to the remaining part of the sequence using the image processing network (NW) that has been fine-tuned.

13 Claims, 9 Drawing Sheets

(51) Int. Cl.

| | |
|---|---|
| ***G06V 10/74*** | (2022.01) |
| *G06V 10/774* | (2022.01) |
| *G06V 10/776* | (2022.01) |
| *G06V 20/40* | (2022.01) |

(52) U.S. Cl.

CPC ............... *G06T 2207/10016* (2013.01); *G06T 2207/20081* (2013.01); *G06V 10/774* (2022.01); *G06V 10/776* (2022.01); *G06V 20/40* (2022.01)

(56) References Cited

U.S. PATENT DOCUMENTS

| | | | | |
|---|---|---|---|---|
| 2019/0130530 | A1* | 5/2019 | Schroers | G06T 3/4007 |
| 2020/0202496 | A1* | 6/2020 | Kokura | G06T 15/20 |
| 2021/0287340 | A1 | 9/2021 | Jen | |
| 2022/0222776 | A1* | 7/2022 | Porikli | G06T 5/20 |
| 2023/0065862 | A1* | 3/2023 | Karabutov | G06T 9/00 |
| 2023/0098437 | A1* | 3/2023 | Li | G06T 3/4038<br>382/299 |

FOREIGN PATENT DOCUMENTS

| | | |
|---|---|---|
| JP | 2020-035094 A | 3/2020 |
| JP | 2020-102012 A | 7/2020 |

OTHER PUBLICATIONS

Jinsu Yoo et al: “Self-Supervised Adaptation for Video Super-Resolution”, Mar. 18, 2021 (Mar. 18, 2021), XP081912265.

* cited by examiner

INFORMATION PROCESSING DEVICE, INFORMATION PROCESSING METHOD, AND COMPUTER-READABLE NON-TRANSITORY STORAGE MEDIUM FOR REDUCING HIGH-DEFINITION RENDERING PROCESSING TIME

CROSS REFERENCE TO PRIOR APPLICATION

This application is a National Stage Patent Application of PCT International Patent Application No. PCT/JP2023/000250 (filed on Jan. 10, 2023) under 35 U.S.C. § 371, which claims priority to Japanese Patent Application No. 2022-030697 (filed on Mar. 1, 2022), which are all hereby incorporated by reference in their entirety.

FIELD

The present invention relates to an information processing device, an information processing method, and a computer-readable non-transitory storage medium.

BACKGROUND

In recent computer graphics (CG) film production, high-definition rendering using ray tracing is performed. However, since the time required for rendering is enormous, reduction of the processing time is desired.

CITATION LIST

Non Patent Literature

Non Patent Literature 1: Pixer: Deep Learned Super Resolution for Feature Film Production <URL:https://graphics.pixar.com/library/SuperResolution/pap er.pdf> (Retrieved on Feb. 15, 2022)

SUMMARY

Technical Problem

In an actual production situation, it is often the case that rendering is performed at a low resolution (such as 2K) and post-processing is performed to enhance the resolution to a high resolution (such as 4K) (up-scaling). As a result, a high-definition video can be generated in a relatively short time. However, the video obtained by up-scaling tends to have insufficient image quality as compared with a video rendered at a high resolution.

Therefore, the present disclosure proposes an information processing device, an information processing method, and a computer-readable non-transitory storage medium capable of generating a high-quality video in a short time.

Solution to Problem

According to the present disclosure, an information processing device is provided that comprises: a tuning unit that fine-tunes an image processing network using, as a learning data set, a first low-resolution video and a high-resolution video corresponding to a part of a sequence; and an upconverter that up-scales a second low-resolution video corresponding to a remaining part of the sequence by using the image processing network that has been fine-tuned. According to the present disclosure, an information processing method in which an information process of the information processing device is executed by a computer, and a computer-readable non-transitory storage medium which stores a program for causing the computer to execute the information process of the information processing device, are provided.

DESCRIPTION OF EMBODIMENTS

Hereinafter, embodiments of the present disclosure will be described in detail on the basis of the drawings. In each of the following embodiments, the same parts are denoted by the same symbols, and redundant description will be omitted.

Note that description will be given in the following order.

[1. Background]
[2. Rendering System]
[3. Information Processing Method]
  [3-1. Selecting Video Area for Fine Tuning]
  [3-2. Fine Tuning]
  [3-3. Processing Flow]
[4. Hardware Configuration Example]
[5. Effects]

1. Background

Figure 1:
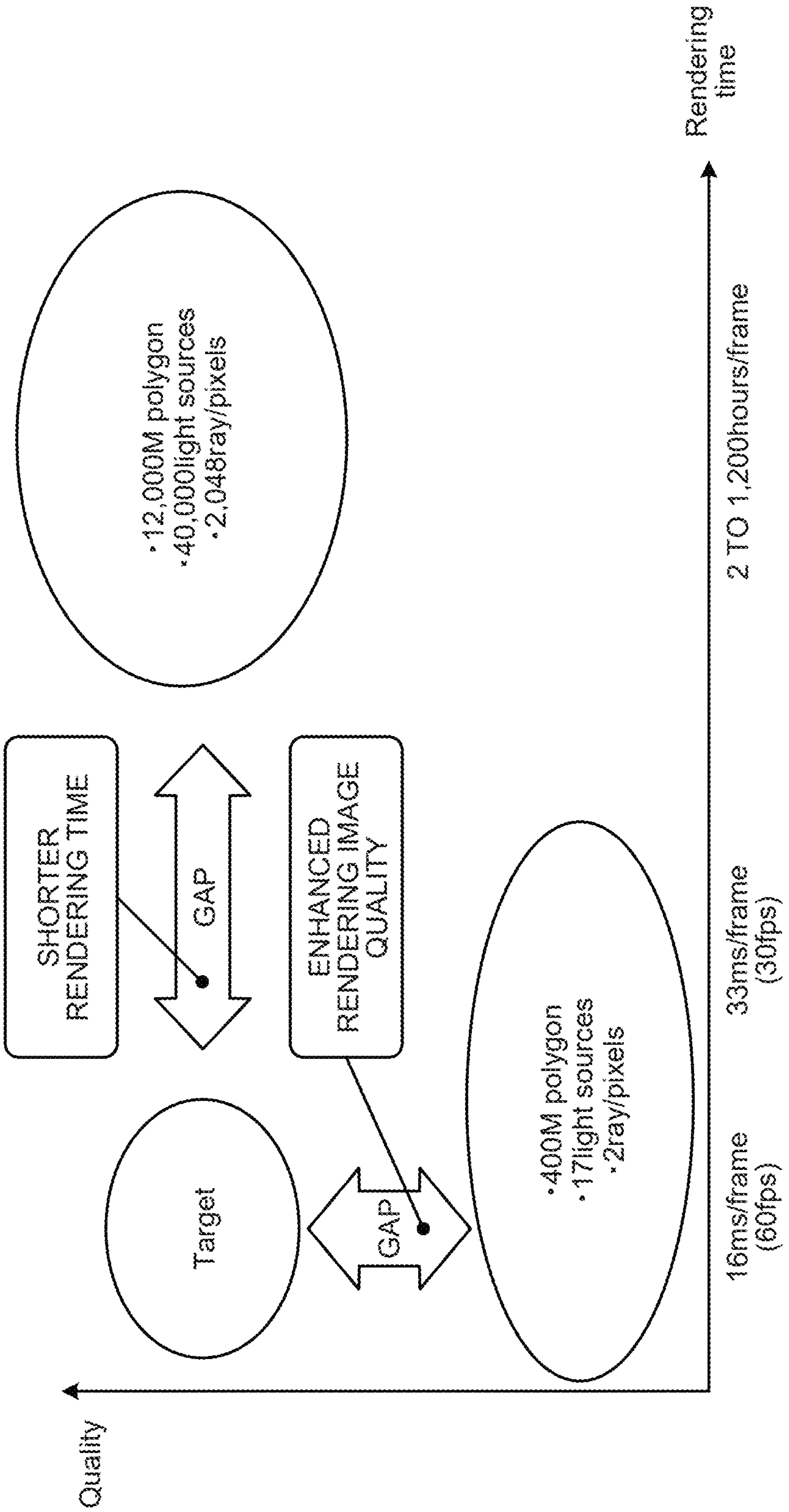
FIG. 1 is a diagram for explaining a background of the present disclosure.
Figure 2:
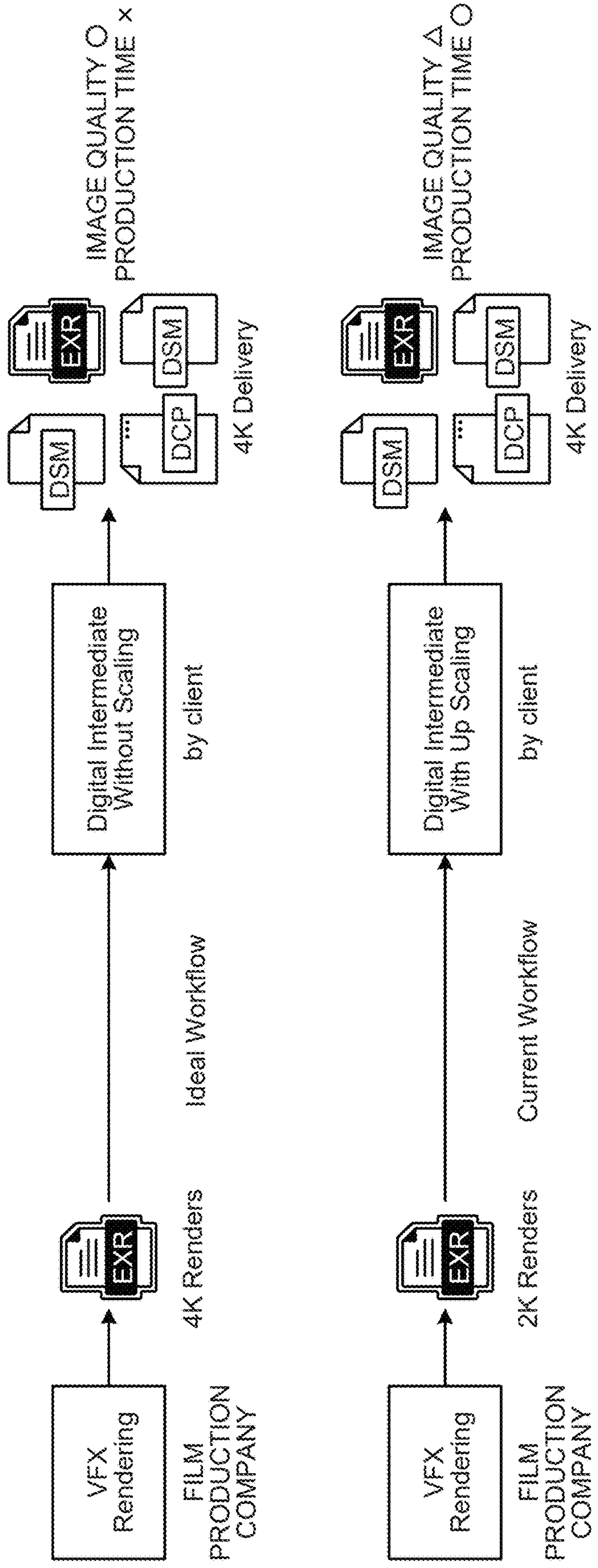
FIG. 2 is a diagram for explaining a background of the present disclosure.

FIGS. 1 and 2 are diagrams for explaining the background of the present disclosure.

In recent CG film production, high-definition rendering using ray tracing is performed; however, it is disadvantageous that time required for rendering is enormous. For this reason, in an actual production situation, it is often the case that rendering is performed at a low resolution (such as 2K) and post-processing is performed to enhance the resolution to a high resolution (such as 4K). This post-processing is called up-scaling.

However, an up-scaled video tends to have insufficient image quality when compared to a video rendered at a high resolution.

In Non-Patent Literature 1, a general-purpose deep neural network (DNN) trained with a general-purpose data set is used for up-scaling. The general-purpose data set refers to a highly versatile learning data set containing various CG contents accumulated before production of the film. In this method, standard image quality can be ensured for various video contents. However, there is a wide variety of videos produced at the production sites, and sufficient image quality cannot be always provided for a target video content.

For example, there are works of a wide variety of tastes in CG films, and there are various scenes even in one work. Although up-scaling performance is greatly improved due to the advent of DNN, it is difficult to robustly exhibit performance for works and scenes of various tastes. Depending on a work or a scene, the restoration effect of a general-purpose DNN is insufficient, and a difference in image quality is large as compared with a video rendered at a high resolution.

Therefore, in the present disclosure, a series of videos is divided into a plurality of sequences, and a dedicated learning data set (dedicated data set) is prepared for each of the sequences. A dedicated data set includes some videos in the sequence. In the present disclosure, a general-purpose DNN is fine-tuned using a dedicated data set, and a dedicated DNN is generated for each sequence. By performing high-precision up-scaling by the dedicated DNN for each sequence, the image quality can be sufficiently enhanced over the entire video.

Hereinafter, specific description will be given.

2. Rendering System

Figure 3:
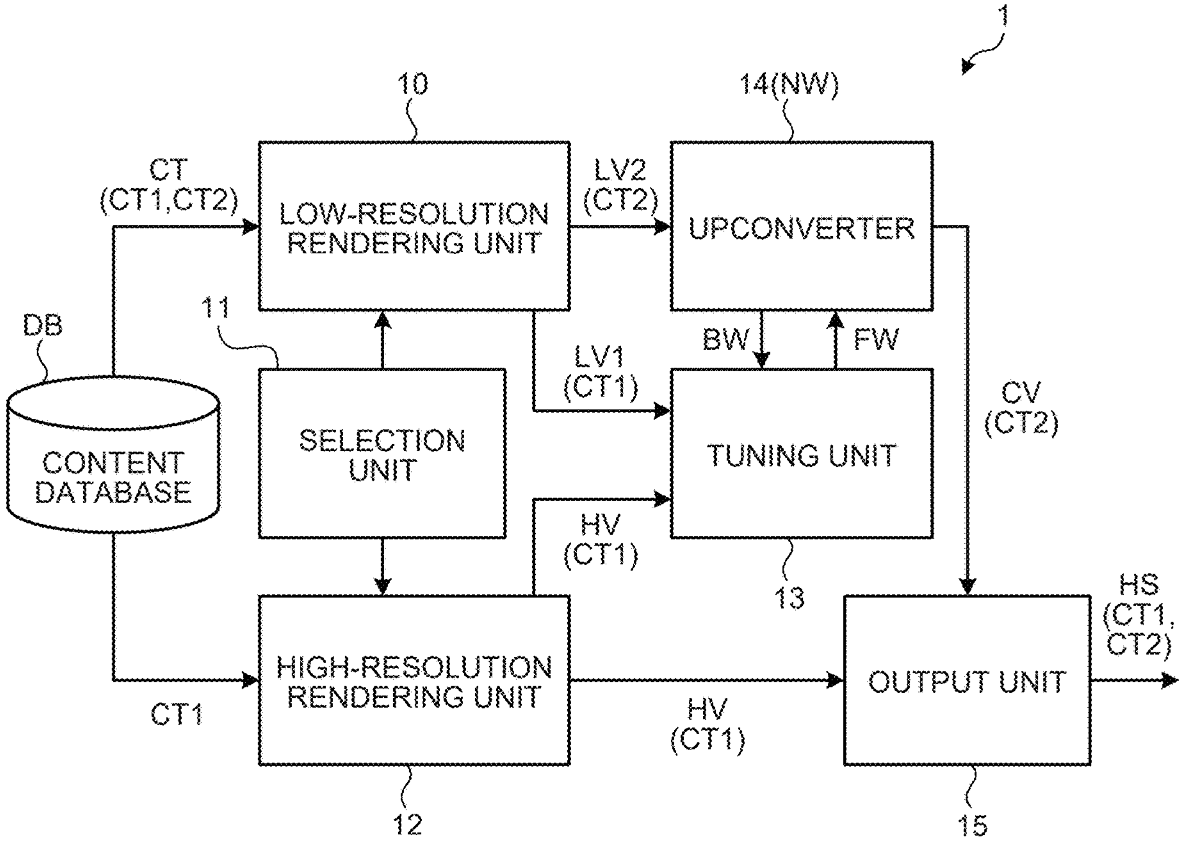
FIG. 3 is a diagram illustrating an example of a rendering system of the present disclosure.

FIG. 3 is a diagram illustrating an example of a rendering system of the present disclosure.

The rendering system of the present disclosure is implemented by an information processing device 1 illustrated in FIG. 3. The information processing device 1 includes, for example, a content database DB, a low-resolution rendering unit 10, a selection unit 11, a high-resolution rendering unit 12, a tuning unit 13, an upconverter 14, and an output unit 15.

The content database DB stores video content CT. The video content CT includes 3D data used for rendering.

The video content CT is output as a high-quality video after low-resolution rendering processing and up-scaling processing.

The low-resolution rendering unit 10 divides a series of videos into a plurality of sequences. The low-resolution rendering unit 10 renders the video content CT at a low resolution for each of the sequences and generates a low-resolution sequence video LS (see FIG. 4). A part of the low-resolution sequence video LS is used for fine tuning of an image processing network NW for up-scaling. Note that the "low resolution" refers to a resolution lower than the resolution of a display video to be finally output. The "high resolution" refers to a high resolution to be provided in the display video.

Hereinafter, a video area used for fine tuning is referred to as a first video area VA1 (see FIG. 4), and video content CT corresponding to the first video area VA1 is referred to as first video content CT1. The remaining video areas not used for fine tuning (all video areas other than the first video areas VA1) are referred to as second video areas VA2 (see FIG. 4), and video content CT corresponding to a second video area VA2 is referred to as second video content CT2.

The selection unit 11 selects a first video area VA1 for fine tuning from a sequence. The low-resolution rendering unit 10 renders the first video content CTI at a low resolution to generate a first low-resolution video LV1 corresponding to a part of the sequence. The low-resolution rendering unit 10 renders the second video content CT2 at a low resolution to generate a second low-resolution video LV2 corresponding to the remaining part of the sequence. The high-resolution rendering unit 12 renders the first video content CT1 at a high resolution to generate a high-resolution video HV.

Figure 4:
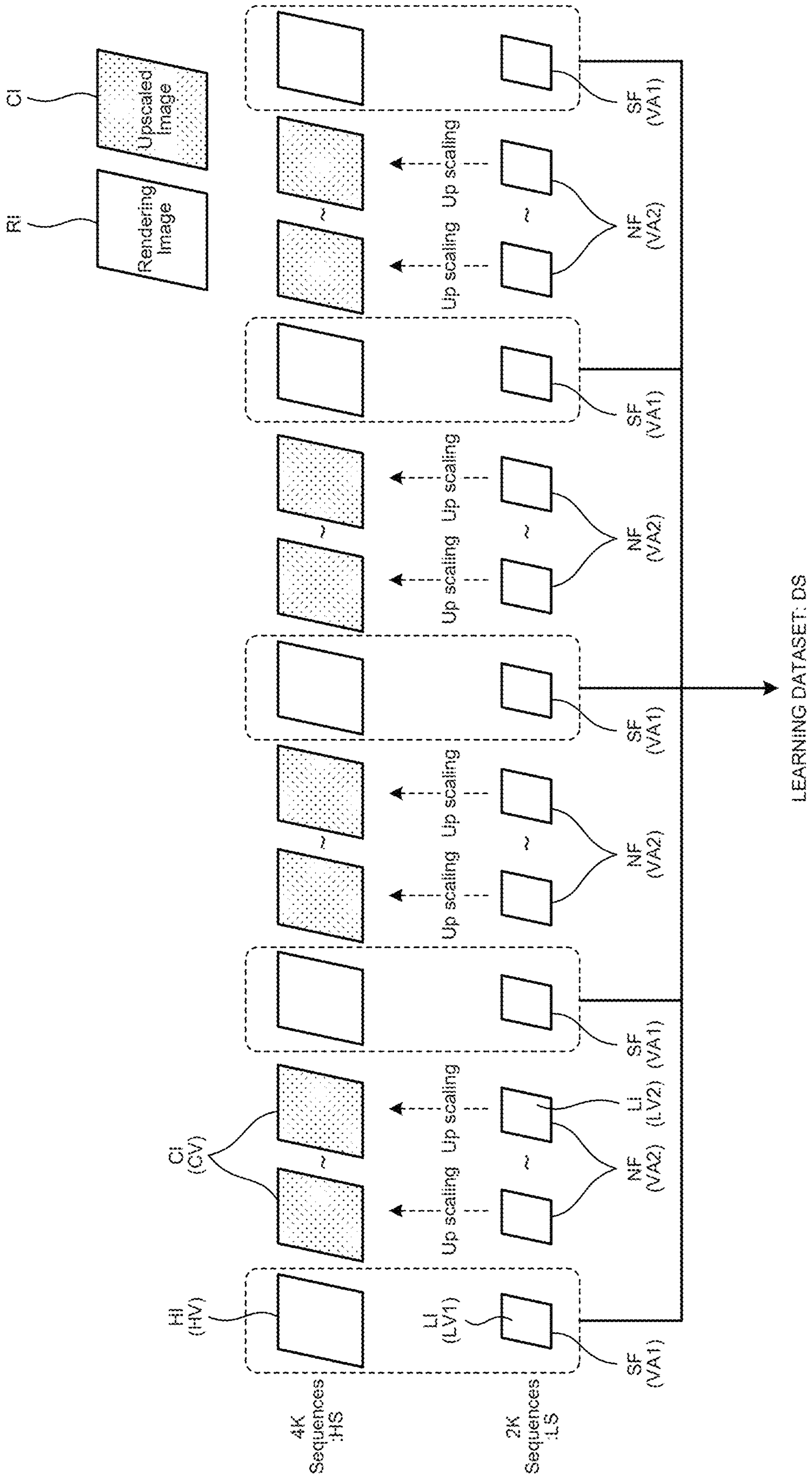
FIG. 4 is a diagram schematically illustrating information processing performed by the rendering system.

The tuning unit 13 fine-tunes the image processing network NW, which is a general-purpose DNN, using the first low-resolution video LV1 (input data) corresponding to the part of the sequence and the high-resolution video HV (correct data) as a learning data set DS (see FIG. 4).

The fine tuning refers to processing of relearning the weight of the entire model using the weight (base weight BW) of a learned network as an initial value. The tuning unit 13 replaces the weight (base weight BW) of the image processing network NW (general-purpose DNN) before relearning with the weight (fine tuning weight FW) after the relearning. As a result, a dedicated image processing network NW (dedicated DNN) specialized for the sequence is obtained.

The upconverter 14 up-scales the second low-resolution video LV2 by using fine-tuned image processing network NW (dedicated DNN). The output unit 15 combines a converted video CV obtained by up-scaling the second low-resolution video LV2 and the high-resolution video HV generated for fine tuning. The output unit 15 outputs a high-resolution sequence video HS obtained by the synthesis as a display video.

3. Information Processing Method

FIG. 4 is a diagram schematically illustrating information processing performed by the rendering system.

The low-resolution rendering unit 10 generates a rendering image RI at a low-resolution (low-resolution rendering image LI) for every frame in the sequence. As a result, a low-resolution rendering video LS including the low-resolution rendering images LI of all the frames is generated.

The selection unit 11 selects a plurality of frames to be used in the learning data set DS on the basis of the order of the frames or an image analysis result of the low-resolution sequence video LS. The plurality of selected frames (selected frames SF) correspond to the first video area VA1, and a plurality of frames that are not selected (unselected frames NF) correspond to the second video area VA2.

The high-resolution rendering unit 12 generates a rendering image RI at a high-resolution (high-resolution rendering image HI) for each of the selected frames SF. As a result, the high-resolution video HV selectively including the high-resolution rendering images HI of the respective selected frames SF is generated.

The tuning unit 13 extracts a low-resolution rendering image LI and a high-resolution rendering image HI generated for the same selected frame SF as an image pair for training. The tuning unit 13 generates the learning data set DS on the basis of image pairs of all the selected frames SF. The tuning unit 13 fine-tunes the image processing network NW of the upconverter 14 using the learning data set DS.

The upconverter 14 extracts the low-resolution rendering images LI of all the unselected frames NF from the low-resolution sequence video LV. The upconverter 14 up-scales the low-resolution rendering images LI of the unselected frames NF using the fine-tuned image processing network NW to generate converted images CI. As a result, the converted video CV selectively including the converted images CI of the respective unselected frames NF is generated.

The output unit 15 combines the high-resolution video HV generated for the first video area VA1 (selected frames SF) and the converted video CV generated for the second video area VA2 (unselected frames NF) to generate the high-resolution sequence video HS. The output unit 15 outputs the high-resolution sequence video HS as the display video.

3-1. Selecting Video Area for Fine Tuning

Figure 5:
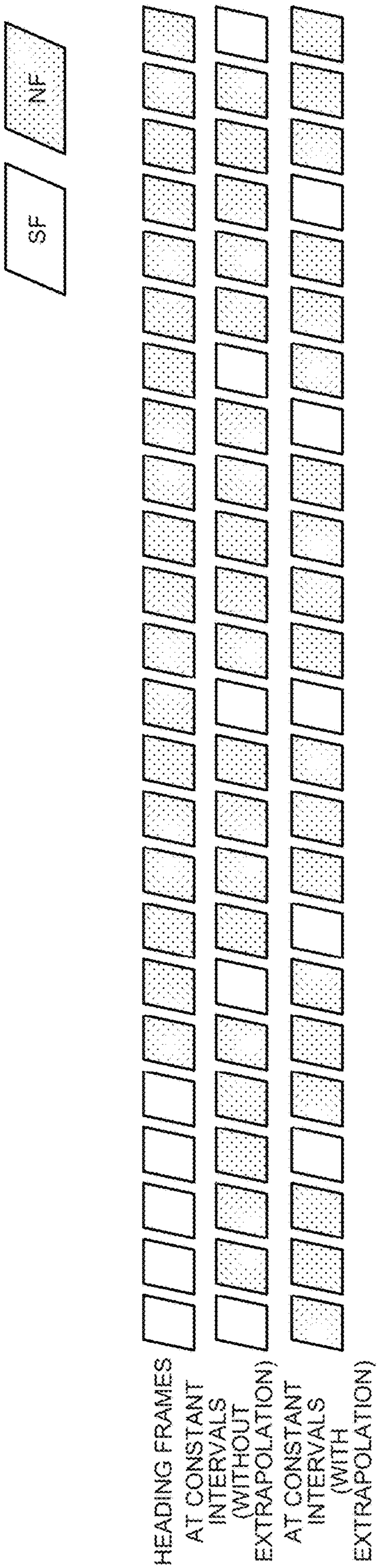
FIG. 5 is a diagram illustrating an example of a selection method of a first video area for fine tuning.
Figure 6:
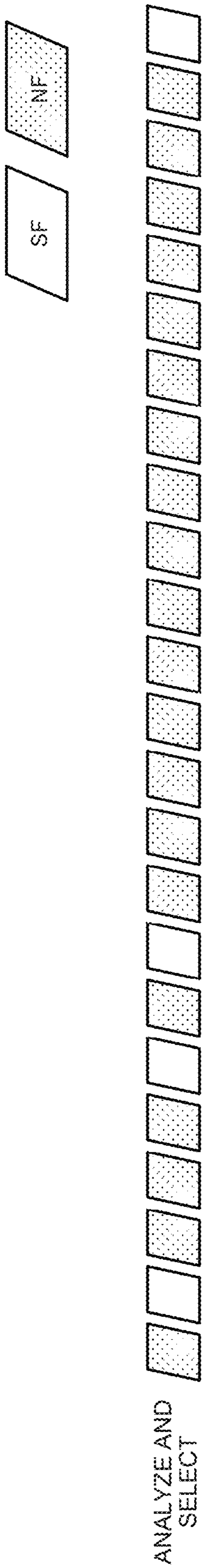
FIG. 6 is a diagram illustrating an example of the selection method of the first video area for fine tuning.

FIGS. 5 and 6 are diagrams illustrating an example of the selection method of the first video area VA1 for fine tuning.

<Mechanical Selection Based on Order of Frames>

The example of FIG. 5 is a selection example based on mechanical processing. The selection unit 11 selects the first video area VA1 on the basis of the order of frames.

For example, in the example in the upper part of FIG. 5, a predetermined number of frames from the head of a sequence are selected as selected frames SF (first video area VA1). In the examples of the middle and the lower part of FIG. 5, a plurality of frames arranged at substantially constant intervals is selected as selected frames SF. The example in the middle of FIG. 5 illustrates a case where there is no extrapolation, and the example in the lower part of FIG. 5 illustrates a case where there is extrapolation.

<Selection Based on Video Content>

The example of FIG. 6 is a selection example based on video content. The selection unit 11 performs image analysis on a sequence to select a first video area VA1.

For example, the selection unit 11 performs image analysis on a low-resolution sequence video LV and selects, as the first video area VA1, a video area whose image similarity exceeds a similarity criterion. The image similarity refers to the similarity between low-resolution rendering images LI. The similarity criterion refers to a criterion for similarity determination. The similarity criterion can be set by a user desirably. The selection unit 11 selects, as the selected frames SF, a plurality of frames having a larger amount of information and a lower image similarity than low-resolution rendering images LI of other frames on the basis of the similarity criterion.

The similarity determination may be performed on the basis of a rule such as a threshold or may be performed using a DNN for similarity determination.

As an example of the former, a method is conceivable in which the similarity determination is performed by calculating the amount of information of the low-resolution rendering images LI using a feature amount such as the variance of the luminance and comparing the calculated amount of information or the image feature amount calculated from the amount of information with a predetermined reference value. Alternatively, it is also conceivable to perform the similarity determination by, after reducing the low-resolution rendering image LI, measuring the image similarity by a peak signal-to-noise ratio (PSNR) or the like and comparing the measured image similarity with the predetermined reference value.

As an example of the latter, it is conceivable to learn in advance a DNN for similarity determination, the DNN capable of selecting a combination of frames having high PSNRs. The learning of the DNN for similarity determination can be performed as follows.

First, the user prepares an image group indicating various characters and scenes. The user determines in advance the number of frames to be selected by the selection unit 11 (the number of selected frames: for example, N). The user measures the PSNR of each image and determines, as correct data, a combination of N images having the highest total value of the PSNRs. The user performs learning of the DNN for similarity determination using the image group and the correct data as the learning data set. As a result, it is made possible to generate a DNN capable of selecting a combination of N frames having high PSNRs (image similarity) with high probability.

3-2. Fine Tuning

Figure 7:
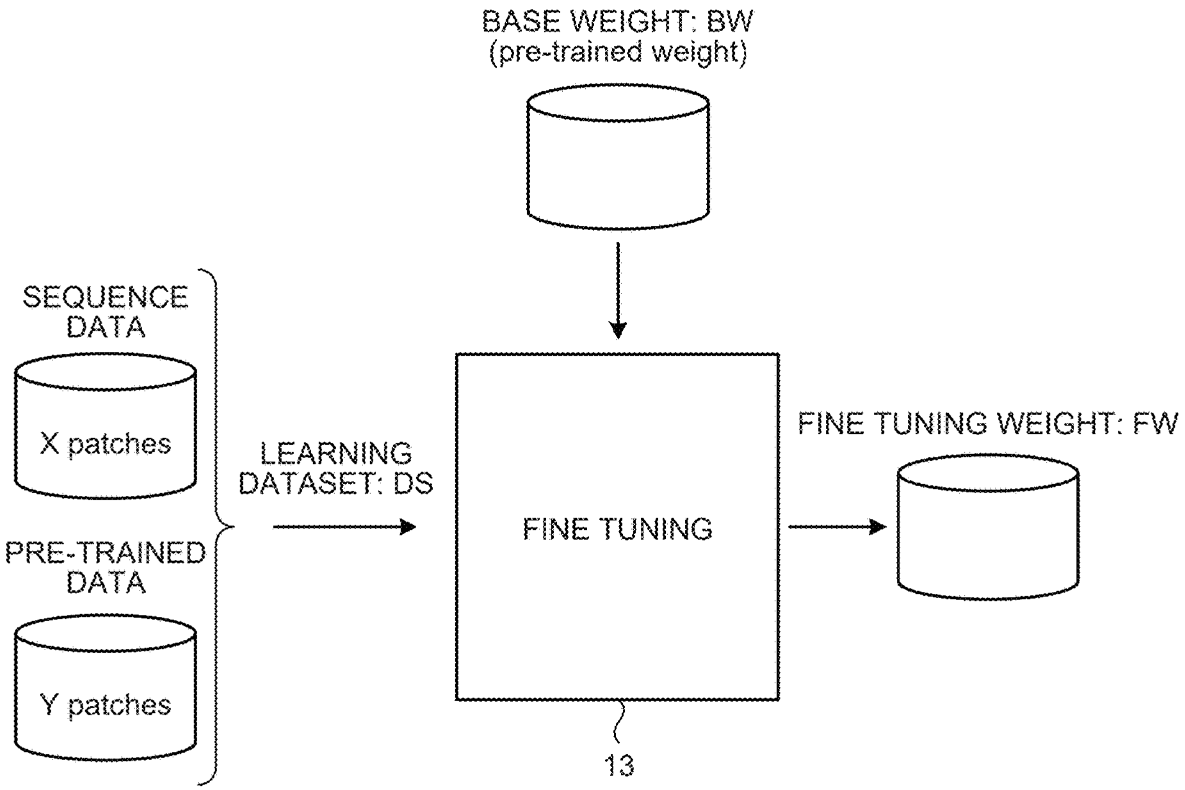
FIG. 7 is a diagram illustrating an example of fine tuning.

FIG. 7 is a diagram illustrating an example of fine tuning.

The tuning unit 13 acquires image pairs of the respective selected frames SF as a learning data set DS. The tuning unit 13 can extract a specific image area as a patch from the image pairs and perform fine tuning using the extracted patch. The size of the patch can be desirably determined, such as 128 pixels×128 pixels or 64 pixels×64 pixels. As an extraction method of the patch, a method of randomly extracting a patch from the images, a method of adaptively extracting a region effective for learning on the basis of an image analysis result and the like are conceivable.

The learning data set DS may include image data other than the above-described image data (image pairs). For example, the tuning unit 13 can add image data of another content different from the video content CT of the sequence to the learning data set DS. The image data of the other content may include, for example, a part of the pre-trained data used for machine learning of the image processing network NW before fine tuning. The tuning unit 13 can use a patch extracted from the pre-trained data for fine tuning. As a result, generalization performance for unknown input is obtained to some extent.

3-3. Processing Flow

Figure 8:
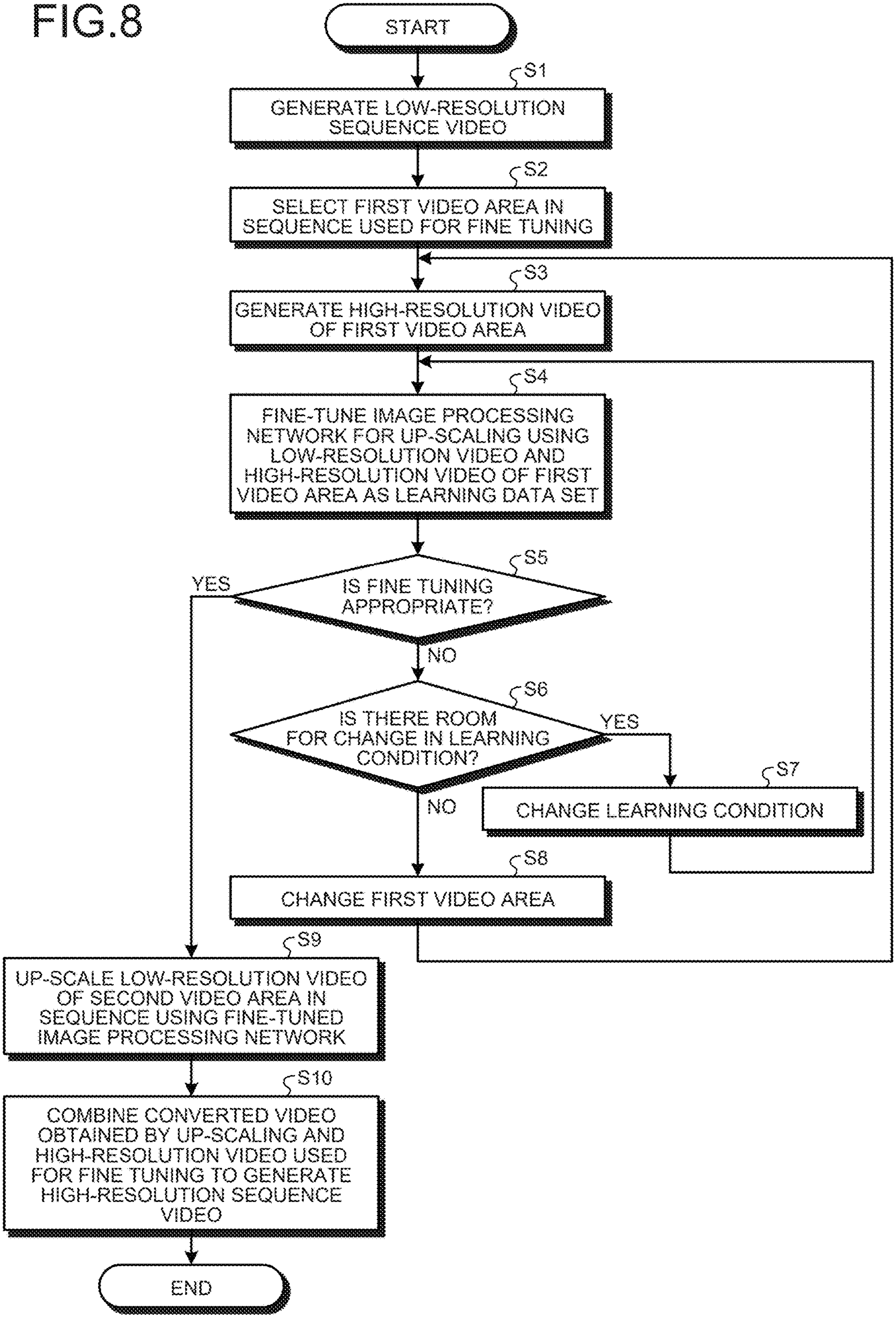
FIG. 8 is a diagram illustrating an example of a processing flow related to generation processing of a display video.

FIG. 8 is a diagram illustrating an example of a processing flow related to generation processing of a display video.

The low-resolution rendering unit 10 renders video content CT of a sequence at a low resolution to generate a low-resolution sequence video LS (step S1). The selection unit 11 selects a first video area VA1 in the sequence used for the fine tuning (step S2). The high-resolution rendering unit 12 renders video content CT of the first video area VA1 at a high resolution to generate a high-resolution video HV (step S3).

The tuning unit 13 fine-tunes the image processing network NW for up-scaling using the low-resolution video LV (first low-resolution video LV1) and the high-resolution video HV of the first video area VA1 as the learning data set DS (step S4). The tuning unit 13 determines whether or not the fine tuning is appropriate (step S5).

For example, the tuning unit 13 uses a part of the learning data set DS as a validation data set. The tuning unit 13 determines appropriateness of the fine tuning on the basis of a comparison result between the converted video CV obtained by up-scaling the first low-resolution video LV1 included in the validation data set and the high-resolution video HV corresponding to the converted video CV.

If the appropriateness satisfies an allowable standard, the tuning unit 13 determines that the fine tuning has been appropriately performed. For example, the tuning unit 13 determines that the fine tuning is completed and ends the learning when the appropriateness satisfies the allowable standard during learning using the learning data set DS. If no such appropriateness that satisfies the allowable standard is obtained, the tuning unit 13 determines that the fine tuning is not appropriately performed. The appropriateness is calculated, for example, as a difference between the converted video CV to be compared and the high-resolution video HV. The allowable standard can be desirably set by the user using a threshold or the like.

If the fine tuning is appropriate (step S5: Yes), the upconverter 14 up-scales the low-resolution video LV (second low-resolution video LV2) of the second video area VA2 in the sequence using the fine-tuned image processing network NW (step S9). The output unit 15 combines the converted video CV obtained by the up-scaling and the high-resolution video HV used for the fine tuning to generate the high-resolution sequence video HS (step S10).

If the fine tuning is not appropriate (step S5: No), the tuning unit 13 determines whether or not there is room for changing learning conditions (step S6). Examples of changing the learning conditions include changing a hyperparameter. If there is room for changing the learning conditions (step S6: Yes), the tuning unit 13 changes the learning conditions (step S7), returns to step S4, and performs learning again.

If there is no room for changing the learning conditions (step S6: No), the tuning unit 13 changes the frames (first video area VA1) used in the learning data set DS (step S8) and returns to step S3 to perform learning again. In step S8, the tuning unit 13 may change the length of the sequence instead of changing the first video area VA1.

4. Hardware Configuration Example

Figure 9:
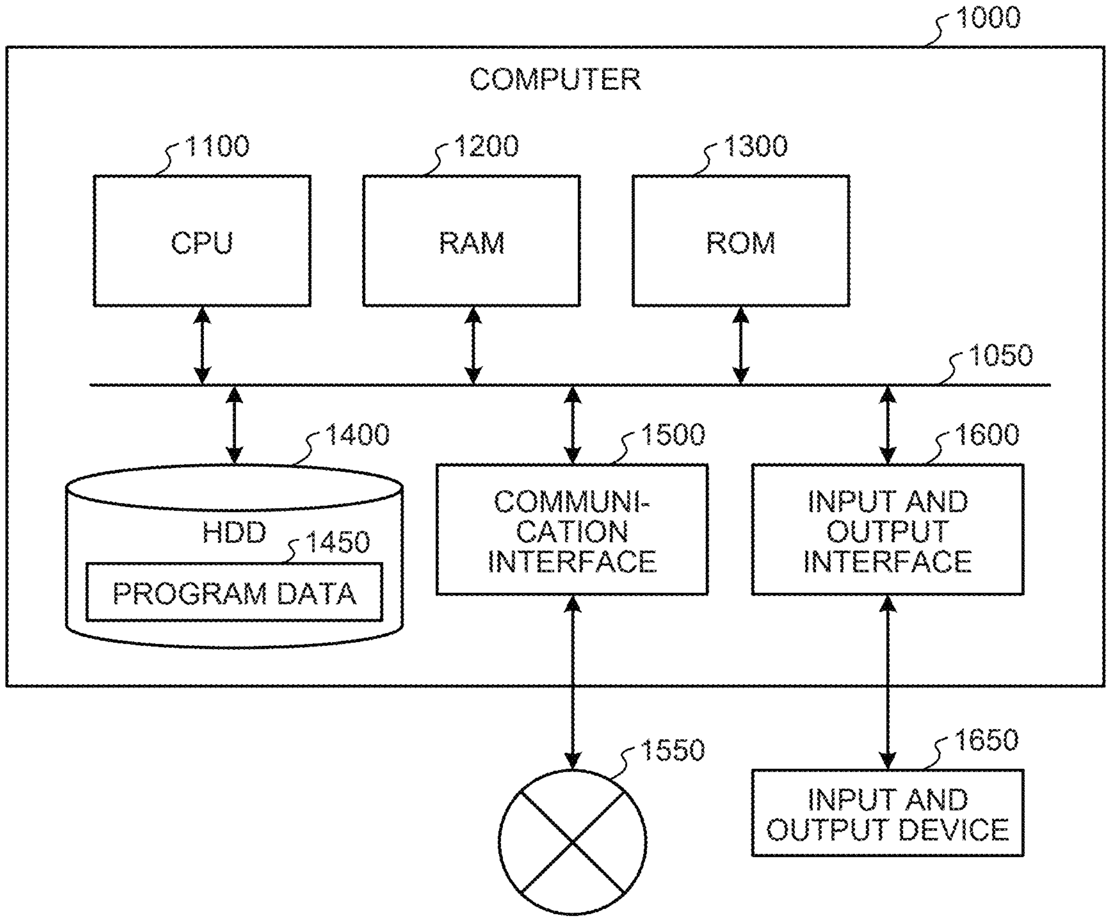
FIG. 9 is a diagram illustrating a hardware configuration example of an information processing device.

FIG. 9 is a diagram illustrating a hardware configuration example of the information processing device 1.

The information processing of the information processing device 1 is implemented by, for example, a computer 1000. The computer 1000 includes a central processing unit (CPU) 1100, a random access memory (RAM) 1200, a read only memory (ROM) 1300, a hard disk drive (HDD) 1400, a communication interface 1500, and an input and output interface 1600. The units of the computer 1000 are connected by a bus 1050.

The CPU 1100 operates in accordance with a program (program data 1450) stored in the ROM 1300 or the HDD 1400 and controls each of the units. For example, the CPU 1100 loads a program stored in the ROM 1300 or the HDD 1400 in the RAM 1200 and executes processing corresponding to various programs.

The ROM 1300 stores a boot program such as a basic input output system (BIOS) executed by the CPU 1100 when the computer 1000 is activated, a program dependent on the hardware of the computer 1000, and the like.

The HDD 1400 is a computer-readable non-transitory recording medium that non-transiently records a program to be executed by the CPU 1100, data used by such a program, and the like. Specifically, the HDD 1400 is a recording medium that records an information processing program according to the present embodiment, which is an example of the program data 1450.

The communication interface 1500 is an interface for the computer 1000 to be connected with an external network 1550 (for example, the Internet). For example, the CPU 1100 receives data from another device or transmits data generated by the CPU 1100 to another device via the communication interface 1500.

The input and output interface 1600 is an interface for connecting an input and output device 1650 and the computer 1000. For example, the CPU 1100 receives data from an input device such as a keyboard or a mouse via the input and output interface 1600. The CPU 1100 also transmits data to an output device such as a display device, a speaker, or a printer via the input and output interface 1600. Furthermore, the input and output interface 1600 may function as a media interface that reads a program or the like recorded in a predetermined recording medium. A medium refers to, for example, an optical recording medium such as a digital versatile disc (DVD) or a phase change rewritable disk (PD), a magneto-optical recording medium such as a magneto-optical disk (MO), a tape medium, a magnetic recording medium, or a semiconductor memory.

For example, in a case where the computer 1000 functions as the information processing device 1 according to the embodiment, the CPU 1100 of the computer 1000 implements the functions of the units described above by executing the information processing program loaded on the RAM 1200. In addition, the HDD 1400 stores the information processing program, various models, and various types of data according to the present disclosure. Note that although the CPU 1100 reads the program data 1450 from the HDD 1400 and executes the program data 1450, as another example, these programs may be acquired from another device via the external network 1550.

5. Effects

The information processing device 1 includes the tuning unit 13 and the upconverter 14. The tuning unit 13 fine-tunes the image processing network NW using, as a learning data set DS, a first low-resolution video LV1 and a high-resolution video HV corresponding to a part of a sequence. The upconverter 14 up-scales the second low-resolution video LV2 corresponding to the remaining part of the sequence by using the fine-tuned image processing network NW. In the information processing method of the present disclosure, the processing of the information processing device 1 is executed by the computer 1000. The computer-readable non-transitory storage medium of the present disclosure stores the program for causing the computer 1000 to implement the processing of the information processing device 1.

According to this configuration, the image processing network NW for up-scaling is appropriately fine-tuned using a part of the video of the sequence. Although it is necessary to generate the high-resolution video HV for fine tuning, a time required for calculation is relatively short since the target video area is only a part of the sequence. Therefore, even in consideration of the time required for fine tuning, a high-quality video of the sequence is generated in a relatively short time. In a verification experiment conducted by the inventor on this point, the following effect of shortening the rendering time was obtained.

<Preconditions of Verification Experiment>

One sequence: 200 frames
Rendering time at a high resolution (4K): 12 hours/frame
Rendering time at a low resolution (2K): 3 hours/frame
Time required for learning fine tuning: 2 hours
Time required for inference (up-scaling): 100 seconds/frame <Comparison of Rendering Times Obtained from Verification Experiment>

Rendering time in a case where all frames were rendered at the high resolution (4K): 100 days
Rendering time in a case of using the method of the present disclosure: about 28 days (Details)

Rendering time for all frames at the low resolution (2K): 25 days
Rendering time for the first video area at the high resolution (4K): 2.5 days
Time required for fine tuning: 2 hours
Time required for inference (up-scaling): about 0.5 hours The information processing device 1 includes the output unit 15. The output unit 15 combines the converted video CV obtained by up-scaling the second low-resolution video LV2 and the high-resolution video HV generated for fine tuning and outputs the combined video as a high-resolution sequence video HS.

According to this configuration, the high-resolution video HV obtained by large-scale calculation is effectively used not only for fine tuning but also as a part of the output video.

The information processing device 1 includes the selection unit 11, the low-resolution rendering unit 10, and the high-resolution rendering unit 12. The selection unit 11 selects the first video area VA1 for fine tuning from a sequence. The low-resolution rendering unit 10 renders the video content CT of the first video area VA1 at a low resolution to generate the first low-resolution video LV1. The low-resolution rendering unit 10 renders the video content CT of second video area VA2 other than the first video area VA1 at the low resolution to generate the second low-resolution video LV2. The high-resolution rendering unit 12 renders the video content CT of the first video area VA1 at a high resolution to generate the high-resolution video HV.

According to this configuration, appropriate fine tuning depending on the selection of the first video area VA1 is performed.

The selection unit 11 selects the first video area VA1 on the basis of the order of frames.

According to this configuration, the first video area VA1 can be mechanically selected.

The selection unit 11 performs image analysis on a sequence to select the first video area VA1.

According to this configuration, an appropriate region depending on the video content CT can be selected as the first video area VA1.

The selection unit 11 selects, as the first video area VA1, a video area whose image similarity exceeds the similarity criterion.

According to this configuration, it is possible to select a region having a large amount of information and low similarity to other frames as the first video area VA1.

The tuning unit 13 adds image data of other content different from the video content CT of the sequence to a learning data set DS.

According to this configuration, generalization performance for unknown input is enhanced.

The image data of the other content includes a part of the pre-trained data used for machine learning of the image processing network NW before fine tuning.

According to this configuration, it is possible to save time and effort for preparing image data of another content anew.

The tuning unit 13 uses a part of the learning data set DS as a validation data set. The tuning unit 13 determines appropriateness of the fine tuning on the basis of a comparison result between the converted video CV obtained by up-scaling the first low-resolution video LV1 included in the validation data set and the high-resolution video HV corresponding to the converted video CV.

According to this configuration, the progress of the fine tuning is quantitatively determined.

The tuning unit 13 determines that the fine tuning is completed when the appropriateness satisfies the allowable standard during learning using the learning data set DS.

According to this configuration, the fine tuning can be automatically ended on the basis of the appropriateness.

In the case where such appropriateness that satisfies the allowable standard cannot be obtained, the tuning unit 13 changes the learning conditions and performs learning again.

According to this configuration, fine tuning with high appropriateness is performed.

In a case where there is no room for changing the learning conditions, the tuning unit 13 changes the video area (first video area VA1) of the sequence used in the learning data set DS or changes the length of the sequence and then performs learning again.

According to this configuration, fine tuning with high appropriateness is performed.

Note that the effects described herein are merely examples and are not limiting, and other effects may also be achieved.

Appendix

Note that the present technology can also have the following configurations.

(1)

An information processing device comprising:

a tuning unit that fine-tunes an image processing network using, as a learning data set, a first low-resolution video and a high-resolution video corresponding to a part of a sequence; and an upconverter that up-scales a second low-resolution video corresponding to a remaining part of the sequence by using the image processing network that has been fine-tuned.

(2)

The information processing device according to (1), further comprising:

an output unit that combines a converted video obtained by up-scaling the second low-resolution video and the high-resolution video and outputs the combined video as a high-resolution sequence video.

(3)

The information processing device according to (1) or (2), further comprising:

a selection unit that selects a first video area for fine tuning from the sequence;

a low-resolution rendering unit that generates the first low-resolution video by rendering video content of the first video area at a low resolution and generates the second low-resolution video by rendering video content of a second video area other than the first video area at a low resolution; and a high-resolution rendering unit that generates the high-resolution video by rendering the video content of the first video area at a high resolution.

(4)

The information processing device according to (3), wherein the selection unit selects the first video area on a basis of an order of frames.

(5)

The information processing device according to (3), wherein the selection unit performs image analysis on the sequence to select the first video area.

(6)

The information processing device according to (5), wherein the selection unit selects, as the first video area, a video area having an image similarity exceeding a similarity criterion.

(7)

The information processing device according to any one of (1) to (6), wherein the tuning unit adds image data of other content different from video content of the sequence to the learning data set.

(8)

The information processing device according to (7), wherein the image data of the other content includes a part of pre-trained data used for machine learning of the image processing network before fine tuning.

(9)

The information processing device according to any one of (1) to (8), wherein the tuning unit uses a part of the learning data set as a validation data set and determines appropriateness of fine tuning on a basis of a comparison result between a converted video obtained by up-scaling the first low-resolution video included in the validation data set and the high-resolution video corresponding to the converted video.

(10)

The information processing device according to (9), wherein the tuning unit determines that fine tuning is completed in a case where the appropriateness satisfies an allowable standard during learning using the learning data set.

(11)

The information processing device according to (10), wherein the tuning unit changes a learning condition and performs learning again in a case where the appropriateness does not satisfy the allowable standard.

(12)

The information processing device according to (11), wherein the tuning unit changes a video area of the sequence used for the learning data set or changes a length of the sequence and performs learning again in a case where there is no room for changing the learning condition.

(13)

An information processing method executed by a computer, the information processing method comprising:

fine-tuning an image processing network using, as a learning data set, a first low-resolution video and a high-resolution video corresponding to a part of a sequence; and up-scaling a second low-resolution video corresponding to a remaining part of the sequence by using the image processing network that has been fine-tuned.

(14)

A computer-readable non-transitory storage medium storing a program for causing a computer to implement:

fine-tuning an image processing network using, as a learning data set, a first low-resolution video and a high-resolution video corresponding to a part of a sequence; and up-scaling a second low-resolution video corresponding to a remaining part of the sequence by using the image processing network that has been fine-tuned.

REFERENCE SIGNS LIST

1 INFORMATION PROCESSING DEVICE
10 LOW-RESOLUTION RENDERING UNIT
11 SELECTION UNIT
12 HIGH-RESOLUTION RENDERING UNIT
13 TUNING UNIT
14 UPCONVERTER
15 OUTPUT UNIT
CT VIDEO CONTENT
CV CONVERTED VIDEO
DS LEARNING DATA SET
LV1 FIRST LOW-RESOLUTION VIDEO
LV2 SECOND LOW-RESOLUTION VIDEO
HS HIGH-RESOLUTION SEQUENCE VIDEO
HV HIGH-RESOLUTION VIDEO
NW IMAGE PROCESSING NETWORK
VA1 FIRST VIDEO AREA
VA2 SECOND VIDEO AREA

The invention claimed is:

1. An information processing device comprising:

circuitry configured to fine-tune an image processing network using, as a learning data set, a first low-resolution video and a high-resolution video corresponding to a part of a sequence;

up-scale a second low-resolution video corresponding to a remaining part of the sequence by using the image processing network that has been fine-tuned;

select a first video area for fine tuning from the sequence;

generate the first low-resolution video by rendering video content of the first video area at a low resolution and generate the second low-resolution video by rendering video content of a second video area other than the first video area at a low resolution; and generate the high-resolution video by rendering the video content of the first video area at a high resolution.

2. The information processing device according to claim 1, wherein the circuitry is further configured to:

combine a converted video obtained by up-scaling the second low-resolution video and the high-resolution video and outputs the combined video as a high-resolution sequence video.

3. The information processing device according to claim 1, wherein the circuitry selects the first video area on a basis of an order of frames.

4. The information processing device according to claim 1, wherein the circuitry performs image analysis on the sequence to select the first video area.

5. The information processing device according to claim 4, wherein the circuitry selects, as the first video area, a video area having an image similarity exceeding a similarity criterion.

6. The information processing device according to claim 1, wherein the circuitry adds image data of other content different from video content of the sequence to the learning data set.

7. The information processing device according to claim 6, wherein the image data of the other content includes a part of pre-trained data used for machine learning of the image processing network before fine tuning.

8. The information processing device according to claim 1, wherein the circuitry uses a part of the learning data set as a validation data set and determines appropriateness of fine tuning on a basis of a comparison result between a converted video obtained by up-scaling the first low-resolution video included in the validation data set and the high-resolution video corresponding to the converted video.

9. The information processing device according to claim 8, wherein the circuitry determines that fine tuning is completed in a case where the appropriateness satisfies an allowable standard during learning using the learning data set.

10. The information processing device according to claim 9, wherein the circuitry changes a learning condition and performs learning again in a case where the appropriateness does not satisfy the allowable standard.

11. The information processing device according to claim 10, wherein the circuitry changes a video area of the sequence used for the learning data set or changes a length of the sequence and performs learning again in a case where there is no room for changing the learning condition.

12. An information processing method executed by a computer, the information processing method comprising:

fine-tuning an image processing network using, as a learning data set, a first low-resolution video and a high-resolution video corresponding to a part of a sequence;

up-scaling a second low-resolution video corresponding to a remaining part of the sequence by using the image processing network that has been fine-tuned;

selecting a first video area for fine tuning from the sequence;

generating the first low-resolution video by rendering video content of the first video area at a low resolution and generating the second low-resolution video by rendering video content of a second video area other than the first video area at a low resolution; and generating the high-resolution video by rendering the video content of the first video area at a high resolution.

13. A computer-readable non-transitory storage medium storing a program for causing a computer to implement:

fine-tuning an image processing network using, as a learning data set, a first low-resolution video and a high-resolution video corresponding to a part of a sequence;

up-scaling a second low-resolution video corresponding to a remaining part of the sequence by using the image processing network that has been fine-tuned;

selecting a first video area for fine tuning from the sequence;

generating the first low-resolution video by rendering video content of the first video area at a low resolution and generating the second low-resolution video by rendering video content of a second video area other than the first video area at a low resolution; and generating the high-resolution video by rendering the video content of the first video area at a high resolution.

* * * * *